United States Patent
Kobayashi (10) Patent No.: US 11,448,303 B2
(45) Date of Patent: Sep. 20, 2022

(54) GEAR COMPONENT

(71) Applicant: MITAKA DENSHI CO., LTD., Nagano (JP)

(72) Inventor: Ken'Ichi Kobayashi, Nagano (JP)

(73) Assignee: MITAKA DENSHI CO., LTD., Nagano (JP)

( * ) Notice: Subject to any disclaimer, the term of this patent is extended or adjusted under 35 U.S.C. 154(b) by 216 days.

(21) Appl. No.: 16/637,091

(22) PCT Filed: Aug. 7, 2018

(86) PCT No.: PCT/JP2018/029654
§ 371 (c)(1),
(2) Date: Apr. 7, 2020

(87) PCT Pub. No.: WO2019/031520
PCT Pub. Date: Feb. 14, 2019

(65) Prior Publication Data
US 2020/0248791 A1  Aug. 6, 2020

(30) Foreign Application Priority Data
Aug. 8, 2017  (JP) .............................. JP2017-153305

(51) Int. Cl.
*F16H 55/06* (2006.01)
*F16H 55/17* (2006.01)
*F16H 55/18* (2006.01)

(52) U.S. Cl.
CPC ............. *F16H 55/06* (2013.01); *F16H 55/17* (2013.01); *F16H 2055/185* (2013.01)

(58) Field of Classification Search
CPC .................................. F16H 55/17; F16H 55/06
See application file for complete search history.

(56) References Cited

U.S. PATENT DOCUMENTS

| 3,200,665 A | 8/1965 | Gears |
| 2002/0043124 A1* | 4/2002 | Shiga .................... B29D 15/00 74/434 |

(Continued)

FOREIGN PATENT DOCUMENTS

| CN | 103388670 | 11/2013 |
| DE | 20 2014 100 830 | 5/2014 |

(Continued)

OTHER PUBLICATIONS

English translation of the International Preliminary Report on Patentability and Written Opinion of the International Searching Authority dated Feb. 11, 2020 in International (PCT) Application No. PCT/JP2018/029654.

(Continued)

*Primary Examiner* — Terence Boes
(74) *Attorney, Agent, or Firm* — Wenderoth, Lind & Ponack, L.L.P.

(57) ABSTRACT

A gear component has an annular form, is made of a metal, and includes tooth portions and a support portion which supports the tooth portions. The tooth portions are provided on an outside of the support portion along an entire circumference thereof, and groove portions are provided along a width direction of the gear component evenly on an annular inner surface of the support portion. At least one groove portion is provided per one tooth portion or two or more (Continued)

adjacent tooth portions, and each groove portion is located to correspond to a position where one tooth portion is present on the support portion.

9 Claims, 5 Drawing Sheets

(56) References Cited

U.S. PATENT DOCUMENTS

| | | | | |
|---|---|---|---|---|
| 2002/0178853 | A1* | 12/2002 | Konishi | F16H 55/06 74/457 |
| 2010/0294064 | A1* | 11/2010 | Seko | B29D 15/00 74/434 |
| 2012/0227529 | A1* | 9/2012 | Fischer | F02N 15/046 74/434 |
| 2014/0135160 | A1* | 5/2014 | Kaiser | F16H 55/06 474/152 |
| 2015/0033894 | A1* | 2/2015 | Okuno | B22F 5/08 74/434 |
| 2016/0017976 | A1* | 1/2016 | Iijima | B29C 45/1459 74/446 |
| 2017/0166239 | A1* | 6/2017 | Kim | B62D 5/008 |
| 2019/0040941 | A1* | 2/2019 | Kiyota | F16H 1/16 |

FOREIGN PATENT DOCUMENTS

| | | |
|---|---|---|
| GB | 2 116 286 | 1/1982 |
| JP | 54-168494 | 11/1979 |
| JP | 58-91046 | 6/1983 |
| JP | 62-59356 | 4/1987 |
| JP | 1-102557 | 7/1989 |
| JP | 2014-66336 | 4/2014 |
| JP | 2015-172436 | 10/2015 |
| JP | 2017-61059 | 3/2017 |

OTHER PUBLICATIONS

Extended European Search Report dated Feb. 8, 2021 in corresponding European Patent Application No. 18844605.8.
International Search Report dated Oct. 30, 2018 in International (PCT) Application No. PCT/JP2018/029654.
Notice of Reasons for Refusal dated Jul. 5, 2022 in Japanese Patent Application No. 2018-228359 with Machine Translation.

* cited by examiner

GEAR COMPONENT

CROSS-REFERENCE TO RELATED APPLICATIONS

This application is a national stage application, filed under 35 U.S.C. § 371, of International Patent Application No. PCT/JP2018/029654, filed on Aug. 7, 2018, which claims the benefit of Japanese Patent Application No. 2017-153305, filed on Aug. 8, 2017, each of which is incorporated by reference herein in its entirety.

TECHNICAL FIELD

The present invention relates to a gear. In particular, the present invention relates to a gear component for manufacturing a lightweight gear wherein a metal and a resin are used. Also, the present invention relates to a gear wherein such gear component is used.

BACKGROUND ART

Gears are used in various machinery. Typical applications of the gears include industrial robots, automobiles, various large or small industrial machines, precision equipment, toys, and the like. In particular, the gears for the industrial robots, the gears for the industrial machines, the gears for the automobiles, and the like are required to have a high strength. In general, metal gears are used as such gears. For example, JP-A 2014-66336 discloses a gear entirely made of a steel.

SUMMARY OF THE INVENTION

Problems to be Solved by the Invention

With recent energy saving promotion, weight reduction of various components is required for the reduction of the energy consumption. Gears are also not exception, and lighter gears are required. Moreover, in the industrial robots, weight reduction of the gears has been required from the viewpoint in that weight reduction of the gears used in the joints is effective for the smooth movement of the robots. In the automobile field, the demand for the electric vehicles is increasing, and the weight reduction of various components of the vehicles is promoted in order to increase the travel distance.

The present inventor studied the reduction of the weight of the gear, and has found that the weight can be reduced by using a resin material for the gear. However, it is difficult to increase the strength of the gear formed of the resin material. Low strength can cause problems in reliability and safety of the gears, especially when the gears are subjected to high loads. For example, if the strength of the gear is low in a surgical robot or the like, there is a concern that an error may occur in the movement of the robot. Since a transmission gear or the like of the automobiles receives a large torque, a trouble may be caused if the strength is low.

An object of the present invention is to provide a gear that enables weight reduction thereof while maintaining a high strength. That is, the object is to provide a lightweight gear having a sufficient strength.

Means for Solving the Problems

The present inventor has conducted extensive studies and found that at least an outer peripheral portion and a central portion of a gear are formed of a metal, and at least a part of the other portion is formed of a resin material, and thereby reducing a weight of the gear while maintaining a strength of the gear, so that the inventor has reached the present invention.

According to a first aspect of the present invention, there is provided a gear which has a wholly annular metal outer peripheral portion having tooth portions and a metal central portion wherein a resin portion is present between the outer peripheral portion and the central portion. In a particularly preferred embodiment, the outer peripheral portion has a plurality of groove portions provided evenly on its annular inner surface.

According to a second aspect of the present invention, there is provided a gear component including tooth portions and a support portion that supports the tooth portions wherein the gear component is wholly annular and formed of a metal. In a particularly preferred embodiment, the support portion is annular, and has a plurality of the groove portions provided evenly on its annular inner surface. This gear component can be used in manufacturing the gear according to the present invention, and the gear component functions as the metal outer peripheral portion.

According to a third aspect of the present invention, there is provided a gear component including tooth portions, a support portion for supporting the tooth portions, a central portion, and a connecting portion for connecting the support portion and the central portion, wherein the support portion is annular as a whole, and the gear component is entirely formed of a metal. This gear component can be used in manufacturing the gear of the present invention, and the gear component functions as the metal outer peripheral portion.

Effects of the Invention

According to the present invention, the strength of the gear can be ensured by forming an outer side of the gear, i.e. the outer peripheral portion, and an inside of the gear, i.e. the central portion with the metal, and the weight of the gear can be reduced by forming the other portion with the resin material. Therefore, according to the present invention, the gear that achieves both of its high strength and its light weight can be provided.

EMBODIMENTS FOR CARRYING OUT THE INVENTION

Hereinafter, the embodiments of the gear according to the present invention will be further described with reference to the drawings. It is noted that the shapes and arrangement and the components for the gears of those embodiments are not limited to the illustrated examples.

Embodiment 1

Figure 1:
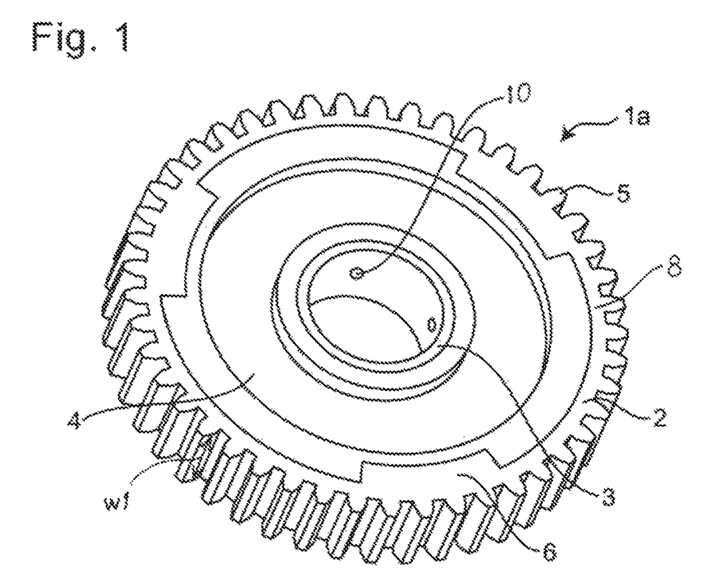
FIG. 1 is a schematic perspective view of a gear 1a according to one embodiment of the present invention.
Figure 2:
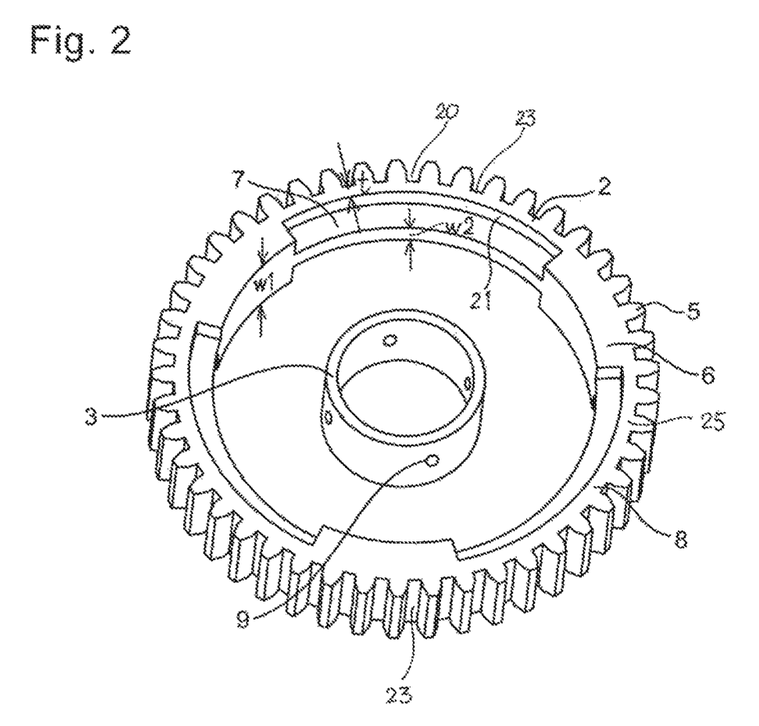
FIG. 2 is a schematic perspective view of an outer peripheral portion 2 and a central portion 3 of the gear 1a according to one embodiment of the present invention.
Figure 3:
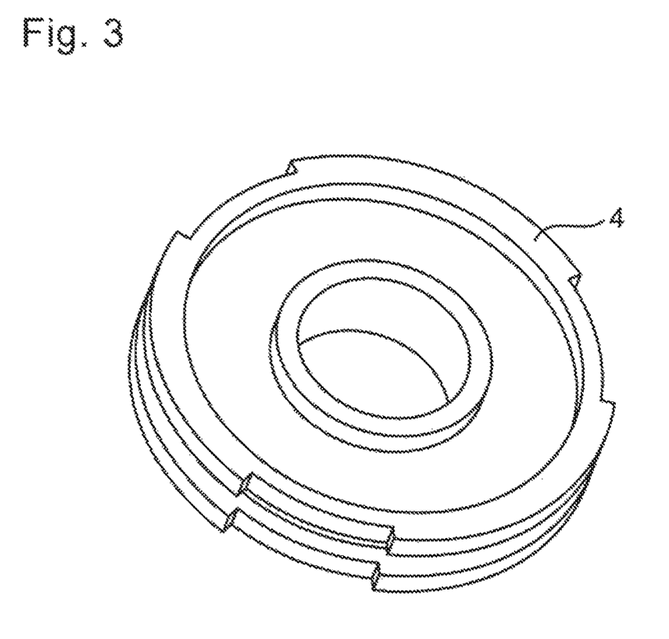
FIG. 3 is a schematic perspective view of a resin portion 4 of the gear 1a according to one embodiment of the present invention.

FIG. 1 schematically shows a perspective view of the gear 1a according to the present embodiment, FIG. 2 schematically shows a perspective view of a metal part of the gear 1a, and FIG. 3 schematically shows a perspective view of a resin part of the gear 1a.

As shown in FIGS. 1 to 3, the gear 1a according to the present embodiment includes an annular outer peripheral portion 2, an annular central portion 3, and a resin portion 4 located between the outer peripheral portion 2 and the central portion 3. The gear of the present invention can have a high strength because the outer peripheral portion 2 and the central portion 3 are formed of a metal. Such high strength allows for use of the gear in mechanical devices where strength is required, for example, transmissions in the automobiles. In addition, since the region between the outer peripheral portion 2 and the central portion 3 is made of a resin instead of a metal, the weight of the gear can be reduced, which can contribute to the weight reduction of a mechanical device using the gear.

The outer peripheral part 2 described above is made of a metal. The metal constituting the outer peripheral portion is preferably a metal having an excellent strength, for example, iron or an alloy of iron, for example, steel. In a preferred embodiment, the outer periphery 2 is formed of a steel, preferably S45C.

The outer peripheral portion 2 described above has 16 tooth portions 5 of the gear on its annular outer surface. That is, the outer peripheral portion 2 described above is a gear component having the tooth portions 5 and a support portion 8 that supports the tooth portions 5. It is noted here that the "support portion" refers to a part between the annular outer surface 20 and the annular inner surface 21. The "annular outer surface" refers to a plane defined by the tooth root circle 22 (i.e. an imaginary plane of the outer peripheral portion which plane includes a tooth root 23 defined by the adjacent tooth portions between them), and the "annular inner surface" refers to an inner surface of the outer peripheral portion 2 when there is no convex portion or protruding portion which will be described below. That is, the support portion 8 corresponds to an annular portion 25 defined by the annular outer surface 20 and the annular inner surface 21.

As to the outer peripheral portion 2, the number of the tooth portions 5, a pitch of the tooth portions, a height of the tooth portions (tooth depth), a width of the tooth portions, and the like constituting the gear can be appropriately set according to the intended application of the gear.

The thickness of the support portion 8 is not particularly limited and can be appropriately selected depending on the application of the gear. For example, the thickness may be not less than 0.5 mm and not more than 20.0 mm, not less than 1.0 mm and not more than 10.0 mm, or not less than 3.0 mm and not more than 8.0 mm. By increasing the thickness of the support portion, the strength of the gear can be further increased. Further, by making the thickness of the support portion smaller, the weight of the gear can be further reduced.

The width "w1" of the outer peripheral portion 2 (a length in the axial direction of the gear) is not particularly limited, and can be appropriately selected depending on the application of the gear. For example, it may be not less than 0.5 mm and not more than 30.0 mm, not less than 3.0 mm and not more than 30.0 mm, not less than 5.0 mm and not more than 20.0 mm, or not less than 10.0 mm and not more than 15.0 mm.

The diameter of the annular outer surface of the outer peripheral portion 2 is not particularly limited and can be appropriately selected depending on the application of the gear. For example, it may be not less than 1.0 mm and not more than 250.0 mm, not less than 10.0 mm and not more than 250.0 mm, not less than 15.0 mm and not more than 200.0 mm, or not less than 20.0 mm and not more than 150.0 mm.

The outer peripheral portion 2 described above has a convex portion 6 on its annular inner surface. In the present embodiment, the convex portions 6 protrude toward the center of the gear, and are provided uniformly over the entire width of the outer peripheral portion 2, and they are provided for example, at the same interval or at the same angle. By providing the convex portions on the annular inner surface of the outer peripheral portion, it is possible to prevent the outer peripheral, portion 2 from moving as to the resin portion 4 in the circumferential direction. This makes it possible to rotate the gear with a stronger force.

In the present embodiment, the convex portions 6 are provided over the entire width of the outer peripheral portion 2 as shown in the drawing, but they are not limited to as shown, and they may be provided over a part of the width of the gear, for example, not less than 30% and not more than 98%, or not less than 50% and not more than 90% of the width of the gear.

In the present embodiment, three of the convex portions 6 are provided evenly on the annular inner surface of the outer peripheral portion 2, that is, at an interval of every 120°. By thus providing a plurality of the convex portions and arranging them evenly, it is possible to more efficiently prevent the circumferential portion 2 from moving as to the resin portion 4 in the circumferential direction. It is noted here that providing the convex portions "evenly" means that when a straight line is drawn from the center of each convex portion to the center of the outer peripheral portion, the angles formed by two adjacent straight lines are all substantially the same.

It is noted that in the present invention, the number of the convex portions is not particularly limited, and it may be preferably not less than 1 and not more than 8, more preferably not less than 2 and not more than 6, still more preferably not less than 3 and not more than 5, and further more preferably three. It is noted that the convex portion is not an essential component, and may not be present.

The height of the convex portion 6 described above is not particularly limited, but may be preferably not less than 5% and not more than 30%, and for example not less than 10% and not more than 15% of the distance from the center of the outer peripheral portion 2 (i.e. the center of the ring defining the outer peripheral portion 2) to the annular inner surface of the outer peripheral portion 2. In one embodiment, the height of the convex portion 6 may be for example, not less than 0.1 mm and not more than 20.0 mm, not less than 1.0 mm and not more than 20.0 mm, not less than 3.0 mm and not more than 10.0 mm, or not less than 3.0 mm and not more than 5.0 mm. By increasing the height of the convex portion, it is possible to more efficiently prevent the outer peripheral portion 2 from moving as to the resin portion 4 in the circumferential direction. Further, by making the height of the convex portion lower, an increase in the weight of the gear due to the formation of the convex portion can be suppressed.

The outer peripheral portion 2 described above has a wall-shaped (or corrugated-shaped or ridge-shaped) protruding portion 7 on its annular inner surface along the circumferential direction of the gear. In the present embodiment, the protruding portion 7 protrudes toward the center of the gear, and is provided over the entire circumference of the annular inner surface of the outer peripheral portion 2 or partially provided at the same interval or angle as illustrated. By providing the protruding portion 7 on the annular inner surface of the outer peripheral portion, it is possible to prevent the outer peripheral portion 2 from moving as to the resin portion 4 in the width direction of the gear.

In the present embodiment, totally three of the protruding portions 7 are provided partially in the circumferential direction on the annular inner surface of the outer peripheral portion 2, but the present invention is not limited to this embodiment. For example, a plurality of the protruding portions 7 may extend with separated in the same interval or angle over a part of the circumference of the annular inner surface of the outer peripheral portion 2, for example, over not less than 20% and not more than 80%, over not less than 30% and not more than 70%, or over not less than 40% and not more than 60% of the circumference of the annular inner surface of the outer peripheral portion. Further, the protruding portion is not an essential component, and may not necessarily be present.

The height of the protruding portion 7 is not particularly limited, but may be preferably not less than 5% and not more than 30%, and for example, not less than 10% and not more than 15% of the distance from the center of the outer peripheral portion 2 to the annular inner surface of the outer peripheral portion 2. In one embodiment, the height of the protruding portion 7 may be, for example, not less than 0.1 mm and not more than 10.0 mm, not less than 1.0 mm and not more than 10.0 mm, not less than 2.0 mm and not more than 6.0 mm, or not less than 3.0 mm and not more than 5.0 mm. By increasing the height of the protruding portion, it is possible to more efficiently prevent the outer peripheral portion 2 from moving as to the resin portion 4 in the width direction of the gear. Further, by making the height of the protruding portion lower, it is possible to suppress the increase in the weight of the gear due to the formation of the protruding portion.

The width of the protruding portion 7 is not particularly limited as long as it is smaller than the width of the outer peripheral portion 2, but a width w2 (a length in the axial direction of the gear) of the protruding portion may be not less than 5% and not more than 50%, and for example not less than 10% and not more than 40%, or not less than 15% and not more than 30% of the width of the outer peripheral portion 2. In one embodiment, the width of the protruding portion 7 may be, for example, not less than 0.1 mm and not more 10.0 mm, not 16 less than 0.5 mm and not more than 10.0 mm, not less than 1.0 mm and not more than 8.0 mm, or not less than 2.0 mm and not more than 5.0 mm. By making the width of the protruding portion 7 wider, it is possible to more effectively prevent the displacement of the outer peripheral portion 2 as to the resin portion 4 in the width direction. Further, by making the width of the protruding portion 7 narrower, it is possible to suppress the increase in the weight of the gear due to the formation of the protruding portion.

In the present embodiment, the protruding portion 7 is provided as a single ridge in the circumferential direction of the annular inner surface of the outer peripheral portion 2, but the present invention is not limited to this. For example, not less than two or more, for example, two, three, or four ridges may be provided in parallel with each other (not necessarily with facing to each other). Increasing the number of the protruding portions 7 can prevent more effectively the displacement of the outer peripheral portion 2 as to the resin portion 4 in the width direction.

The central portion 3 described above is made of a metal. The metal constituting the central portion is preferably a metal having an excellent strength, and for example, iron or an alloy of iron, for example, a steel may be exemplified. In a preferred embodiment, the central portion 3 is formed of a steel, preferably S45C.

In a preferred embodiment, the metal material forming the central portion 3 is the same as the metal material forming the outer peripheral portion 2 as described above, and it is for example, a steel.

In the present embodiment, the central portion 3 is annular. Since the central portion 3 is annular, it becomes easy to ensure the strength of the gear.

The thickness of the central portion 3 is not particularly limited, but may be, for example, not less than 0.1 mm and not more than 10.0 mm, not less than 0.5 mm and not more than 5.0 mm, or not less than 1.0 mm and not more than 3.0 mm. By increasing the thickness of the central portion, the strength of the gear can be further increased. Further, by making the thickness of the central portion smaller, the weight of the gear can be further reduced.

The diameter of an annular outer surface of the central portion 3 is not particularly limited, but may be, for example, not less than 0.5 mm and not more than 100.0 mm, not less than 1.0 mm and not more than 100.0 mm, not less than 3.0 mm and not more than 50.0 mm, or not less than 5.0 mm and not more than 30.0 mm.

The central portion 3 described above may have a concave portion 9 on its annular outer surface. In the present embodiment, a hole may be provided instead of the concave portion 9 which hole passes through the ring portion of the central portion 3. By providing the concave portion or the hole in the central portion 3, the resin penetrates into the concave portion or the hole, and thereby preventing the central portion 3 from moving as to the resin portion 4 in the circumferential direction. This makes it possible to rotate the gear with a stronger force. It is noted that in FIG. 3, the protruding portion 10 of the resin which is formed by the through-hole 9 and has a form corresponding to the through-hole is omitted to be shown.

In the present embodiment, four of the concave portions 9 are provided evenly on the ring of the central portion 3, that is, four concave portions are formed at an interval of every 90°. By providing a plurality of the concave portions and arranging them evenly in this way, it is possible to more efficiently prevent the central portion 3 from moving as to the resin portion 4 in the circumferential direction.

In the present invention, the number of the concave portions is not particularly limited, and may be preferably not less than one and not more than eight, more preferably not less than two and more than six, and further preferably not less than two and not less than five. Further, the concave portion is not an essential component and may not be present. Further, the concave portion does not need to pass through the central portion 3 and may be provided as a depression.

The resin portion 4 described above is located between the outer peripheral portion 2 and the central portion 3. In a conventional gear, a part corresponding to the resin portion of the gear of the present invention is also formed of a metal, so that the weight of the gear is large. On the other hand, the weight of the gear according to the present invention can be reduced by providing the resin portion as compared with the conventional gear.

The resin part 4 described above is made of a resin. As the resin constituting the resin portion is not particularly limited, but for example, a liquid crystal polymer (LCP), a polyphenylene sulfide resin (PPS), a polyetheretherketone resin (PEEK) and the like may be exemplified. When oil resistance and heat resistance are required, the PEEK is preferred as the resin.

The resin portion 4 has a ring form. The annular outer surface of the resin portion 4 has a shape corresponding to the shape of the annular inner surface of the outer peripheral portion 2. The annular inner surface of the resin portion 4 has a shape corresponding to the shape of the annular outer surface of the central portion 3. By making the annular outer surface and the annular inner surface of the resin portion 4 correspond to the shapes of the annular inner surface of the outer peripheral portion 2 and the annular outer surface of the central portion 3, respectively, the adhesions of the resin portion to the outer peripheral portion and also to the central portion are improved. Thus, the displacement of the resin portion as to the outer peripheral portion and the central portion can be prevented. Further, since no gap is formed between the resin portion 4 and the outer peripheral portion 2 or between the resin portion 4 and the central portion 3, the strength of the gear is further improved.

Embodiment 2

Figure 4:
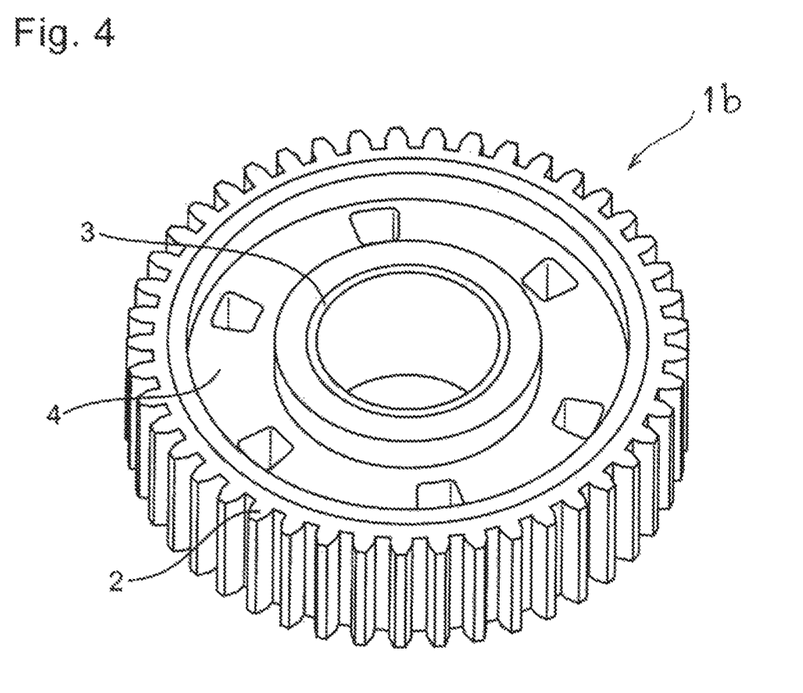
FIG. 4 is a schematic perspective view of a gear 1b according to one embodiment of the present invention.
Figure 5:
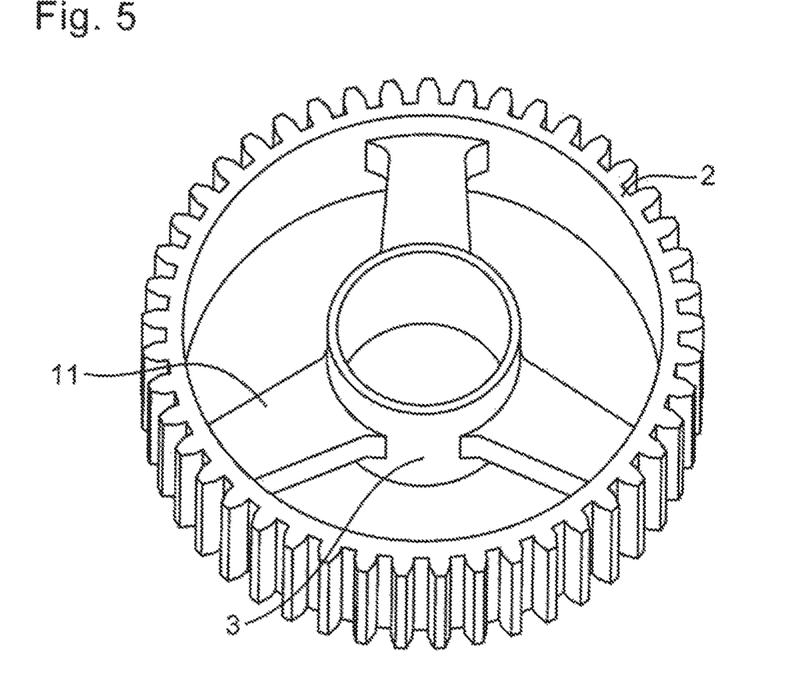
FIG. 5 is a schematic perspective view of an outer peripheral portion 2 and a central portion 3 of the gear 1b according to one embodiment of the present invention.

FIG. 4 shows a perspective view of the gear 1b according to the present embodiment, and FIG. 5 shows a schematic perspective view of a metal portion of the gear 1b.

As shown in FIGS. 4 and 5, the gear 1b of the present embodiment includes an annular outer peripheral portion 2, an annular central portion 3, connecting portions 11 which connect the outer peripheral portion 2 and the central portion 3, and a resin part 4 located between the annular outer peripheral portion 2 and the central portion 3. The gear 1b of the present embodiment has a higher strength by providing the connecting portions 11 connecting the outer peripheral portion 2 and the central portion 3.

The connecting part 11 described above is preferably formed of a metal. The metal constituting the connecting portion is preferably a metal having an excellent strength, and for example, iron or an alloy of iron, for example, a steel. In a preferred embodiment, the connecting portions 11 are formed from a steel, preferably S45C.

In a preferred embodiment, the metal material forming the connecting portion 11 is the same as the metal material forming the outer peripheral portion 2 and the central portion 3 as described above, and preferably a steel.

The connecting portion 11 described above may be separately formed and joined to the outer peripheral portion 2 and the central portion 3 or may be formed integrally with the outer peripheral portion 2 and the central portion 3. The connecting portion 11 is preferably formed integrally with the outer peripheral portion 2 and the central portion 3 because the strength can be further increased.

In the present embodiment, the three connecting portions 11 are provided evenly on the annular inner surface of the outer peripheral portion 2, that is, at an interval of every 120°. By providing a plurality of the connecting portions and arranging them evenly in this way, the strength of the gear can be further increased.

In the present invention, the number of the connecting portions is not particularly limited, but may be preferably not less than 2 and not more than 8, more preferably not less than 2 and not more than 6, still more preferably not less than 3 and not more 5, and most preferably three.

The shape of the connecting portion 11 described above is not particularly limited, but it is preferable that a part close to the central portion 3 is relatively thicker and a part close to the outer peripheral portion 2 is relatively thinner. For example, as shown in the drawing, it is preferable that a part on the side of the central portion 3 has a relatively larger width and a part on the side of the outer peripheral portion 2 has a relatively smaller width. It is noted that the width of the connecting portion means a length or width in a direction perpendicular to the axis of the gear and also orthogonal to the radial direction of the gear. By adopting such a shape of the connecting portion, a high strength can be secured while reducing the volume occupied by the connecting portion, that is, increasing the effect of the weight reduction.

In a preferred embodiment, a planar shape of the connecting portion 11 is preferably a substantially trapezoidal shape in which a vertex of an approximately isosceles triangle is cut off. With regard to the connecting portion 11, a ratio of a width of the side of the outer peripheral portion (that is, a width of an upper base of the substantially trapezoidal shape) to a width of the side of the central portion 3 (that is, a width of a lower base of the substantially trapezoidal shape) is not particularly limited, but it is in the range from 1:10 to 9:10, preferably in the range from 3:10 to 9:10, and more preferably in the range from 5:10 to 8:10. It is noted that the width of the side of the outer peripheral portion of the connecting portion 11 refers to a distance between two contacts formed by two side surfaces (that is, the two substantially trapezoidal legs) of such connecting portion respectively with the annular inner surface of the outer periphery portion in a planar shape of the connecting portion (that is, substantially the trapezoidal shape). Similarly, the width of the connecting portion 11 on the side of the central portion means a distance between two contacts formed by the two side surfaces (i.e. two substantially trapezoidal legs) of the connecting portion respectively with an annular outer surface of the central portion in the planar shape of the connecting portion (that is, substantially the trapezoidal shape).

In the present embodiment, the outer peripheral portion 2, the central portion 3, and the connecting portions 11 constitute a single component. Therefore, the present invention also provides a gear component including the tooth portions, the support portion which supports the tooth portion, the central portion, and the connecting portions which connect the support portion and the central portion, wherein the support portion has an annular shape, and the gear component is entirely made of the metal.

In the present embodiment, the other portions except the connecting portions 11, the outer peripheral portion 2, the central portion 3, and the resin portion 4 may be the same as those of the gear 1a.

Further, at least one of the features of the gear 1a of the above-described embodiment and a gear 1c which will be described below may be incorporated in the gear 1b of 6 the present embodiment if necessary.

Embodiment 3

Figure 6:
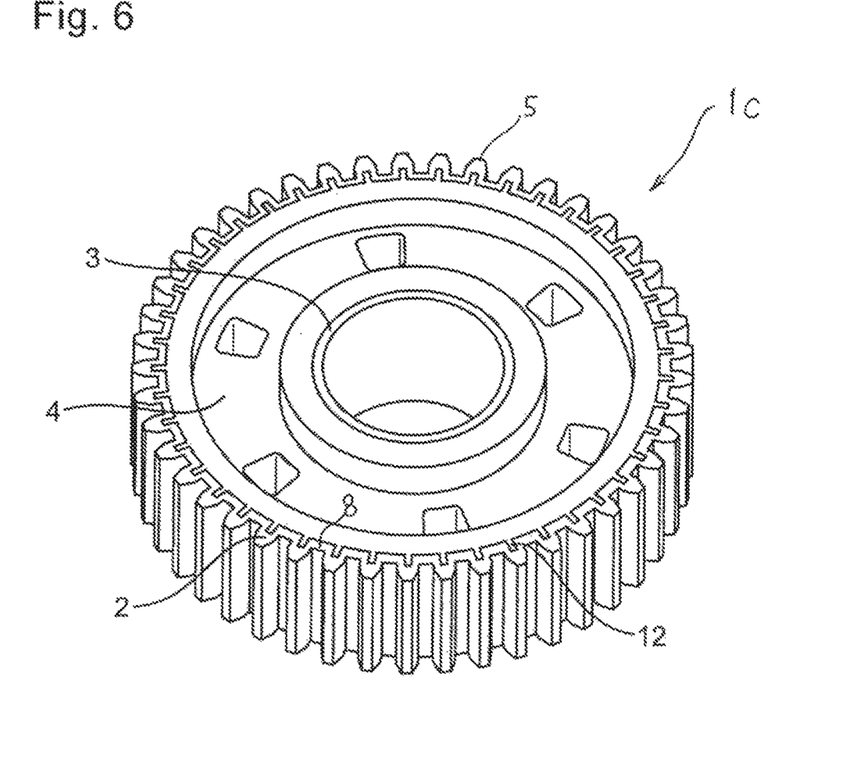
FIG. 6 is a schematic perspective view of a gear 1c according to one embodiment of the present invention.
Figure 7:
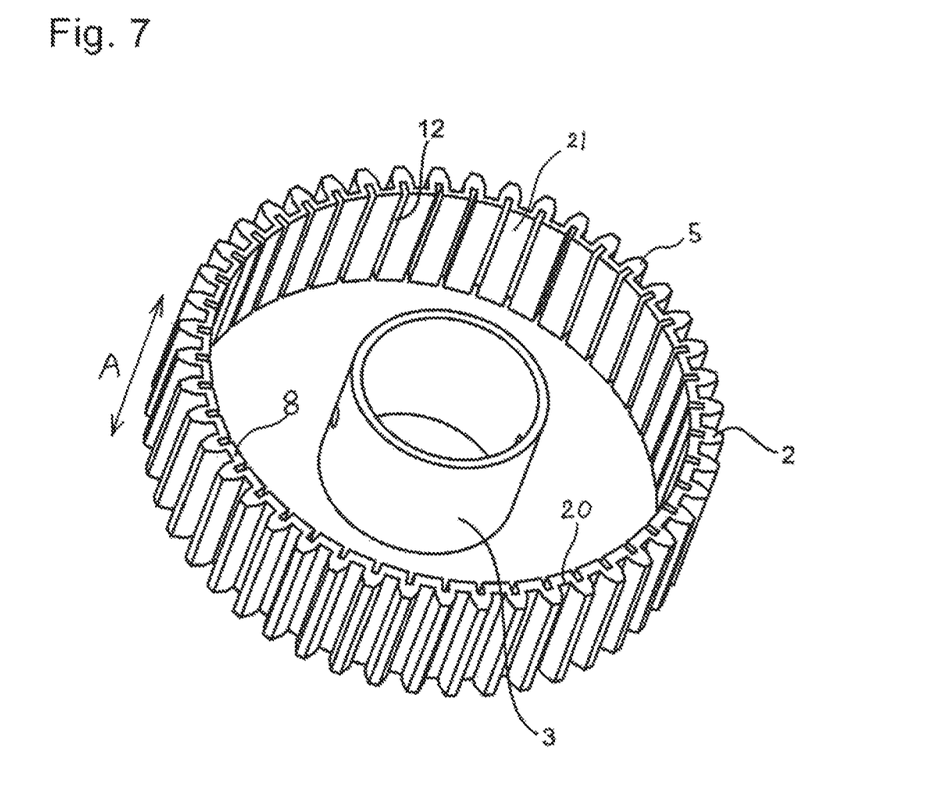
FIG. 7 is a schematic perspective view of an outer peripheral portion 2 and a central portion 3 of the gear 1c according to one embodiment of the present invention.
Figure 8:
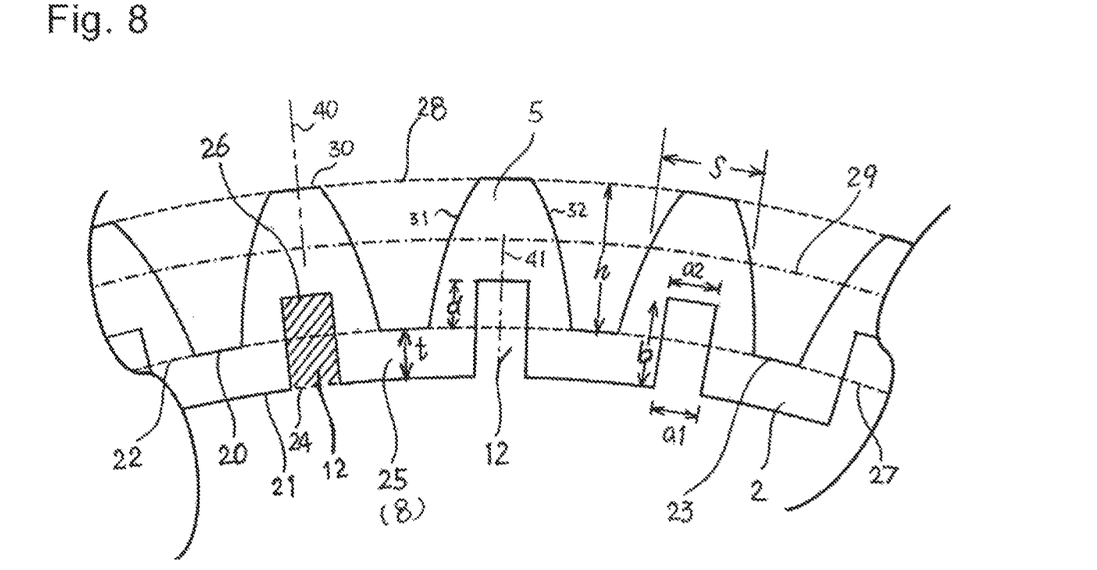
FIG. 8 is an enlarged schematic plan view of a part of the outer peripheral portion 2 of the gear of FIG. 7.

FIG. 6 shows a perspective view of the gear 1c according to the present embodiment, and FIG. 7 shows a schematic perspective view of a metal part of the gear 1c, that is, a gear component of the gear 1c. FIG. 8 schematically shows an enlarged plan view of a part of an outer peripheral portion 2 of the gear of FIG. 7.

As shown in FIGS. 6 and 7, the gear 1c of the present embodiment comprises an annular outer peripheral portion 2, an annular central portion 3, and a resin portion 4 located between the outer peripheral portion 2 and the central portion 3. The outer peripheral portion 2 of the present embodiment has groove portions 12 along the gear width direction (in other words, the gear thickness direction, that is, the direction of the arrow A in FIG. 7) on its annular inner surface 21. The resin portion 4 extends also inside the groove portions 12. By providing 26 the groove portions 12 on the annular inner surface 21 of the support portion 8 of the outer peripheral portion 2, it is possible to prevent the outer peripheral portion 2 from moving as to the resin portion 4 in the circumferential direction. This makes it possible to rotate the gear with a stronger force. It is preferable that a large number of the groove portions 12 exist over the entire width of the periphery of the outer peripheral portion 2 as shown in the drawing, that is, along entirely a width of the outer peripheral portion, but they may also exist along a part of the width.

The gear 1c has a plurality of, usually a large number of tooth portions 5 uniformly over the entire circumference of the annular outer surface 20, that is, at an every equal angle with respect to the center of the annular ring. The number of the tooth portions can be appropriately selected depending on the application of the gear, and may be, for example, at least 20, at least 40, at least 60 or more. A plurality of the groove portions 12 are present evenly over the entire circumference of the annular inner surface 21, that is, at an every equal angle with respect to the center of the annular ring. The number of the groove portions can be appropriately selected according to the application of the gear, and the number of the tooth portions may be for example, at least 20, at least 40, at least 60 or more. The number of the tooth portions and the number of the groove portions are not necessarily the same as described below, but in one preferred embodiment they are the same, and there is one groove portion inside each tooth portion as shown.

The cross-sectional shape of the groove portion 12 described above (cross-sectional shape in a plane perpendicular to the width direction of the gear) is preferably a shape which follows the cross-section of the tooth portion 5 of the gear (that is, substantially geometrically similar to the cross-sectional shape of the tooth portion) with respect to the plan view in FIG. 8. However, in other embodiment, it is preferable that the shape of the tooth portion is one which does not follow the shape of the tooth portion, and for example it is preferable that the shape is substantially a tetragon such as a rectangle. When the cross section of the groove portion follows the cross section of the tooth portion of the gear, the strength of the gear may be insufficient depending on the application. However, when the generally tetragon shape is employed so that a thickness of the tooth portion is ensured, the strength of the gear 1s relatively improved. Further, by making the shape approximately tetragon, it is possible to further prevent the circumferential direction sliding between the outer peripheral portion 2 and the resin portion 4.

FIG. 8 is referred to which is a plan view schematically showing a part of the outer peripheral portion 2 with enlarged. The groove portion 12, particularly its cross-section may have any suitable shape (one of such cross-section is shown as hatched in FIG. 8). For example, the cross-section is substantially rectangle shape having a frontage length "a1", a groove bottom length "a2" and a depth length "b" as shown. It is noted that the cross section means a section perpendicular to the width direction "A" of the gear. However, the portion 24 corresponding to the annular inner surface 21 is in an open state (that is, such portion is open, and the side (or surface) 24 is imaginary). The cross-sectional shape of the groove portion 12 may be substantially a tetragon, in which case, it is for example, a rectangle (in case of a square: a1=a2=b, and in case of a rectangular: a1=a2≠b), or a trapezoid (a1<a2, and "b" is arbitrary, and particularly, isosceles trapezoidal). In addition to such a shape, the cross-sectional shape of the groove portion 12 may be a triangle ("a1" is arbitrary, and a2≈0), a semicircle, a semi-ellipse, or the like.

In the embodiment shown in FIG. 8, the cross section of the groove portion 12 is substantially rectangular (a1=a2<b). In a preferred embodiment, the cross-section of the groove portion 12 is line-symmetric, and the groove portion 12 is arranged in the tooth 5 such that the axis 40 of the tooth portion 5 and the axis 41 of the groove portion 12 coincide. This is advantageous because the tooth flanks 31 and 32 on both sides of the tooth portion 5 have the same strength. When the cross section of the groove portion has a corner portion, that portion may be chamfered.

The groove portion 12 described above is preferably formed in the annular inner surface 21 so as to correspond to the position where the tooth portion 5 of the outer peripheral portion 2 of the gear 1s present (i.e. such that the groove portion 12 is located inside the tooth portion 5). In other words, the axis of symmetry of the tooth portion and the axis of symmetry of the groove portion are configured to coincide with each other as described above, and as a result, the groove portion 12 faces to the tooth portion as illustrated.

The present invention does not exclude an embodiment in which the groove portion 12 is formed inside the location where the tooth root 23 exists (that is, an embodiment in which the symmetry axis of the groove portion is located in the middle of the symmetry axes of the adjacent tooth portions). In such an embodiment, the thickness "t" of the annular portion 25 (corresponding to the support portion 8 as described above) of the outer peripheral portion 2 is reduced by the depth "b" of the groove portion (that is, the depth length "b"), as a result of which the strength of the outer peripheral portion 2 may be reduced. This reduction of the strength means that the thickness "t" of the annular portion 25 is sacrificed. In some cases, the strength is insufficient, so that it is not necessarily preferable. Therefore, in order to compensate for the reduction of the strength, it is necessary to increase the thickness "t" of the annular portion 25 of the outer peripheral portion. Increasing the thickness increases an amount of metal in the outer peripheral portion 2, and eventually increases the weight of the gear, which may not be preferable in some cases.

On the other hand, with respect to the outer peripheral portion 2, in the portion where the tooth portion 5 exists, the tooth portion 5 can function as if it were a part of the annular portion as to the strength of the outer peripheral portion 2. Specifically, even if the thickness of the annular portion 25 is reduced, there is the tooth portion 5 which can also function as the annular portion, so that this can suppress or compensate for the decrease in the strength of the outer peripheral portion. Therefore, in the case where the groove portion 12 is formed at the location which corresponds to the location of the tooth portion 5 as described above, even if a part of the thickness "t" of the annular portion 25 is used for the depth "b" of the groove portion, the strength of the outer peripheral portion is ensured since there still exist a balance of the annular portion outside the groove portion and also the tooth portion outside the balance.

Further, in an embodiment in which the depth "b" of the groove portion 12 is larger than the thickness "t" of the annular portion 25 (this embodiment corresponds to an "intruding" embodiment described below), an amount of the metal forming the outer peripheral portion is reduced, so that the weight of the gear can be preferably reduced. In this case, since the substantially sufficient tooth portion 5 exists outside the groove portion, the strength of the outer peripheral portion 2 can be appropriately secured. In this embodiment, by making at least one of the groove width, the groove bottom, and the groove depth (or the degree of intruding) of the groove portion as large as possible, the outer peripheral portion can be made lighter while securing appropriate strength of the outer peripheral portion. As will be described later, when the number of the groove portions is increased, the force acting on each 6 groove portion can be reduced, so that the groove portions can be configured accordingly. As a result, at least one of the groove width and the groove bottom and the groove depth (or the degree of intruding) can be made larger.

When the groove portions are formed corresponding to the tooth portions as described above, the expense of the thickness of the annular portion can be minimized or compensated, so that the decrease in the strength of the outer peripheral portion 2 due to the formation of the groove portions can be suppressed as much as possible. Since the formation of such groove portions does not require the thickness "t" of the annular portion of the outer peripheral portion 2 to be increased, it is effective in reducing the weight of the outer peripheral portion and hence the gear.

By forming the groove portions 12 so as to correspond to the tooth portions 5 as described above, it is possible to form the groove portions while suppressing or compensating for the decrease in the strength of the outer peripheral portion 2, and/or it is possible to make the depth of the groove portions 12 longer (compared to the case where the groove portions 12 are formed inside the locations where the tooth roots are present), so that it is possible to efficiently prevent the circumferential movement between the outer peripheral portion 2 and the resin portion 4. Conversely, the formation of the groove portions can avoid the formation of a part of the annular portion 25 of the outer peripheral portion 2 which part has an excessively small thickness "t", and thereby facilitating an appropriate strength to be maintained.

In a preferred embodiment, as shown in FIG. 8, the outer peripheral portion is formed such that the groove portions 12 intrude into the tooth portions 5, and the resin portion 4 is formed so that the resin penetrates into such groove portions 12. In this specification, the embodiment of "intruding" means that the positions of the groove bottoms 26 of the groove portions 12 are located outside the root circle 27 (shown with a dotted line in FIG. 8) of the tooth portions 5 of the gear. The degree of intruding may be expressed by a ratio of a distance "d" by which the groove bottom 26 extends beyond the root circle 27 (which is referred to as "intruding length") to a height of the tooth portion 5, that is, a tooth depth "h" (which is equal to (diameter "da" of tip circle 28−diameter "df" of root circle 27)×0.5), and such ratio is referred to as "intrusion degree". That is, the intrusion degree="d/h". If the intrusion degree is too large, the depth "b" of the groove portion becomes excessively large, so that the distance between the groove portion and the tooth tip 30 or the tooth flank 31 or 32 (substantially the thickness of the outer peripheral portion) becomes too small, which may lead to insufficient strength of the outer periphery portion.

Further, when the bottom length "a2" of the groove portion is excessively long, the thickness of a part of the tooth portion 5 adjacent to the groove portion (that is, the distance between the tooth flank 31 or 32 and the groove portion 12) becomes too small, the strength of the outer peripheral portion may be reduced similarly. In this regard, it is preferable to consider a ratio of the groove bottom length "a2" to the tooth thickness of the tooth portion 50, particularly a chordal tooth thickness "s" based on a reference circle 29 (shown with a dashed-dotted line in FIG. 8). Such ratio (=2a/s) is referred to as a "groove bottom length ratio" of the tooth portion.

In a particularly preferred embodiment of the present invention, the cross-sectional shape of the groove portion 12 is an isosceles trapezoid (wherein a1>a2). This embodiment will be described in detail with reference to FIG. 9, which schematically shows a part of a single tooth portion in a plan view. In the shown embodiment, the tooth portion 5 has a tip 30 as a part of a tip circle 28, and on both sides thereof, tooth flanks 31 and 32 rising from a root circle 27. As shown in the drawing, the tip of the groove portion 12, that is, the groove bottom 26 is located outside the root circle 27. That is, the groove portion is in the state of being intruding into the tooth portion.

Figure 9:
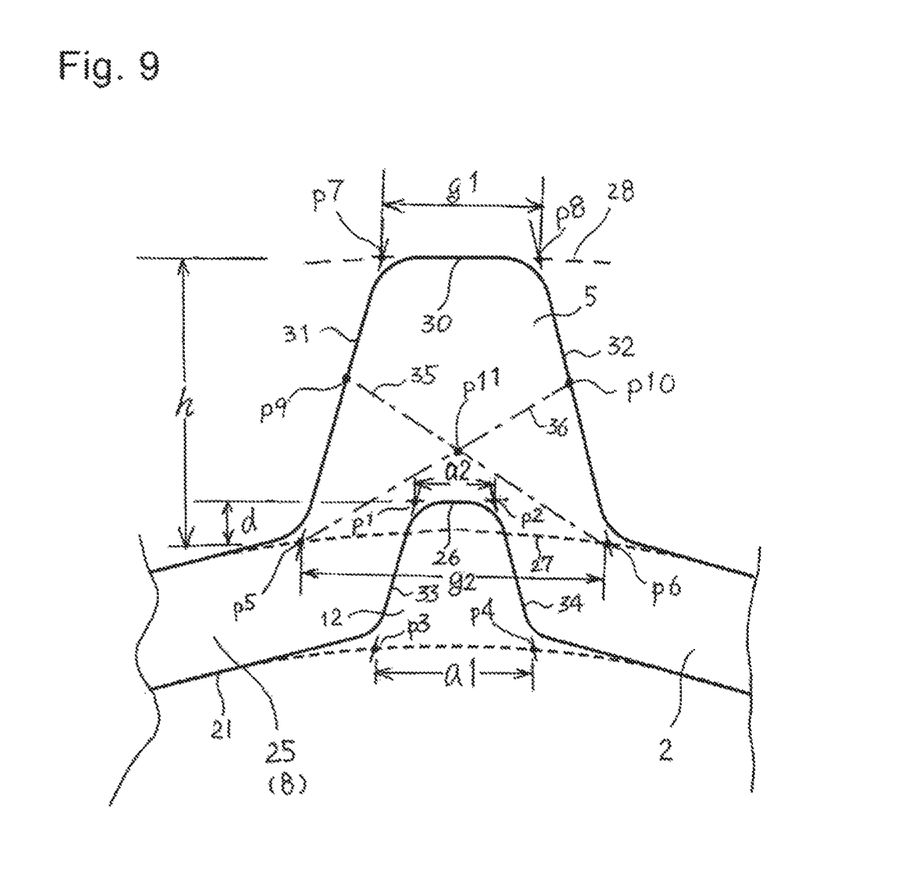
FIG. 9 is an enlarged schematic plan view of a tooth portion in a case where a cross section of a groove portion has an equilateral trapezoid shape (it is noted that corner portions are chamfered).

It is noted that the both end portions of each of the tooth flanks (31 and 32) of the tooth portion 5 as well as the trapezoidal leg portions (33 and 34) of the groove portion are chamfered. In other words, both end portions of the tooth tip 30 and the groove bottom 36 are chamfered. When chamfered as shown, the distance between intersections p1 and p2 of the substantially straight extension of the trapezoidal leg portions (33 and 34) and the substantially straight extension of the groove bottom 26 corresponds to the groove bottom length "a2". The distance between intersections p3 and p4 between the circle 21 defining the annular inner surface and the extension of the leg portions (33 and 34) corresponds to the frontage length "a1". The distance between the groove bottom 26 and the straight line connecting the intersections "p5" and "p6" between the extension lines of the tooth flanks 31 and 32 and the root circle 27 (the intersections are referred to as "root points") corresponds to a length by which the groove bottom 26 substantially extends beyond the tooth root circle 27, that is, the intruding length "d". In addition, it is preferable that the chamfer in the tooth tip 30 is rounded with a large radius as much as possible.

In the embodiment in which the groove portion 12 has an isosceles trapezoidal cross section as described above, it is preferable that the cross sectional shape of the groove portion 12 and the cross sectional shape of the tooth portion 5 are substantially in a geometrically similar relationship or a relationship close thereto. It is noted that the geometrically similar relationship means that a ratio of the distance "g1" between the intersection points "p7" and "p8" of the extension lines of the tooth flanks 31 and 32 with the tip circle 28 and the distance "g2" between "p5" and "p6" is close or preferably substantially equal to the ratio of "a2" and "a1". That is, this preferred embodiment is represented by the following equation:

$$g1:g2 \approx (\text{or} =) a2:a1$$

When the dimensions of the tooth portion and the groove portion are geometrically similar or close to being geometrically similar as described above, it is possible to avoid the occurrence of an excessively thin thickness part in the outer peripheral portion, so that it is convenient because the strength of the outer peripheral portion is easily ensured as uniformly as possible. Excessive intruding of the groove portion 12 is particularly preferably to be avoided because the thickness of the outer peripheral portion 2 is reduced near the groove bottom 26. As a guide, when an intersection "p11" of a straight line 35 connecting the pitch point "p9" of the tooth portion 5 and the tooth root point "p6" and a straight line 36 connecting the other pitch point "p10" of the groove portion and the tooth root point "p5" is obtained, it is preferable that the groove bottom 26 does not does not exist outside beyond the point "p11", and it is more preferable that the groove bottom 26 is as close to the point "p11" as possible. It is desirable to appropriately select the depth length "b" and the groove bottom length "a2" of the groove portion 12 so that the groove bottom 26 becomes close to the point "p11" as much as possible.

In any embodiment of the gear 1c, the number of the groove portions 12 is not particularly limited, but it is preferable to arrange the tooth portions uniformly around the outer peripheral portion 2, that is, at an every equal angle with respect to the center of the outer peripheral portion. The number of groove portions is plural, and preferably many (for example, the number of the groove portions and the number of the tooth portions are the same, so that one groove portion is formed in each tooth portion), and thereby the movement of the outer peripheral portion 2 as to the resin portion in the circumferential direction is more effectively avoided. As to the embodiment in which the groove portions 12 are formed corresponding to the tooth portions 5 so that the groove portions 12 are located inside the tooth portions 5. In a particularly preferred embodiment, one groove portion is provided for a plurality of the tooth portions, preferably for 4 to 10 or more adjacent tooth portions, for example, for five adjacent tooth portions. More preferably, one groove portion is uniformly provided for adjacent 3 or 2 tooth portions. In the most preferred embodiment, at least one groove portion, usually one groove portion is provided for one tooth portion 5. That is, the groove portions 12 are provided so that each of them corresponds to the respective tooth portion 5 (that is, one tooth portion and one groove portion are paired). As a result, each tooth portion 5 has the groove portion 12 inside thereof, and the number of the tooth portions 5 and the number of the groove portions 12 are the same. In this embodiment, it is particularly preferred that the groove portions 12 intrudes into the tooth portions 5. That is, each groove portion provided in each tooth portion can share and resist a circumferential force that can cause relative circumferential displacement between the outer peripheral portion 2 and the resin portion 4, so that a resistance capacity of each groove portion can be smaller. Therefore, in some embodiments, the formation of shallow (i.e. smaller "b") and/or narrow (i.e. smaller "a1" and/or "a2") groove portions may be sufficient, which simplifies manufacture of the outer periphery portion 2, and also, the formation of the resin portion 4 by molding can be simplified.

As to the groove portions 12, when the groove bottom length "a2" of the groove portion 12 is excessively large, the thickness of the metal part of the outer peripheral portion 2 adjacent to the groove portion may be reduced, so that the strength of the outer peripheral portion may be insufficient as described above. In such case, it is preferable to set the "groove bottom length ratio" within an appropriate range.

Furthermore, when the cross-sectional shape of the groove portion is too thin and long or too thick and short, it is often not preferable in consideration of the strength of the outer peripheral portion and the weight of the outer peripheral portion. In such case, it is preferable that an aspect ratio of the cross-sectional shape of the groove portion (that is, $a1/b$) is set in an appropriate range. In addition, when the groove portion 12 excessively intrudes into the tooth portion 5, the outer peripheral portion may be similarly reduced in its strength. In such case, it is preferable that the "intruding degree" is within an appropriate range. Therefore, although it depends on the materials to be used, it is generally appropriate that the gear 1c of the present invention, particularly the gear 1n which the cross-sectional shape of the groove portion 12 is a rectangular or isosceles trapezoid satisfies for example the ratios shown in the following table in relation to the dimensions of the groove portion 12 and other dimensions related to the tooth portion 5.

TABLE 1

| ratio | preferable ratio range (%) | more preferable ratio range (%) | most preferable ratio range (%) | one example of ratio range (%) |
|---|---|---|---|---|
| groove bottom length ratio (a2/s) | 1/6 to 1/1.5 (17 to 67%) | 1/5 to 1/2 (20 to 50%) | 1/4 to 1/2.5 (25 to 40%) | 35/100 (35%) |
| intruding degree (d/h) | 1/10 to 1/2 (10 to 50%) | 1/6.5 to 1/2.5 (15 to 40%) | 1/4 to 1/3 (25 to 33%) | 30/100 (30%) |
| aspect ratio (a1/b) | 1.2/1 to 1/8 (120 to 13%) | 1/1 to 1/4 (100 to 25%) | 0.8/1 to 1/3 (80 to 33%) | 50/100 (50%) |

In a preferred embodiment, the distance from the tooth surface of the gear to the groove portion, that is, the length between the tooth tip and the groove bottom can be appropriately selected according to the application of the gear and the materials constituting the gear, and it is for example not less than 1.0 mm, preferably not less than 1.2 mm, and for example, not less than 2.0 mm.

The depth of the groove (that is, the depth "b") is not particularly limited, and an appropriate depth can be selected according to the application of the gear and the materials constituting the gear, and it may be preferably not less than 0.5 mm and not more than 20.0 mm, for example not less than 1.0 mm and not more than 10.0 mm, or not less than 2.0 mm and not more than 5.0 mm. By increasing the depth of the groove portion, it is possible to more efficiently prevent the movement in the circumferential direction of the peripheral portion 2 as to the resin portion 4, and further reduce the weight of the gear. Also, by making the groove depth shallower, it becomes easier to keep the strength of the gear.

In the present embodiment, other portions except the groove portion 12 of the outer peripheral portion 2, the central portion 3, and the resin portion 4 can be the same as those of the gear 1a or 1b.

Further, similarly to the above, in the gear 1c of the present embodiment, at least one of the features of the gear 1a and the gear 1b of the above embodiments may be incorporated as necessary.

Although the gears according to the present invention have been described in detail while showing several embodiments, the present invention is not limited to the gears of the above-described embodiments, and various design changes are possible without departing from the scope of the present invention.

For example, in the above-described embodiments, all of the central portions are annular, but the present invention is not limited to this, and the inside of the annular portion may be filled.

Further, if possible, the convex portion and the concave portion for preventing the movement between the outer peripheral portion and the resin portion, and also the movement between the central portion and the resin portion may have the opposite forms, that is, the concave portion and the convex portion respectively.

The gear of the present invention is preferably manufactured by integral molding. For example, it can be obtained by placing the outer peripheral portion and the central portion in a mold, then pouring a liquid resin into the mold, and curing or solidifying the resin. By using the integral molding, a gear having a more precise structure can be manufactured with higher accuracy, and thereby the strength of the gear 1s further improved.

The present invention discloses, but is not limited to, the following modes.

Mode 1. A gear comprising an annular metal outer peripheral portion having tooth portions and a metal central portion, wherein
a resin portion is present between the outer peripheral portion and the central portion.

Mode 2. The gear according to mode 1, wherein the outer peripheral portion has a convex portion on an annular inner surface of the outer peripheral portion which convex portion protrudes toward a center of the annular inner surface.

Mode 3. The gear according to mode 1 or 2, wherein the outer peripheral portion has a wall-shaped protruding portion along a circumferential direction of the gear on an annular inner surface of the outer peripheral portion.

Mode 4. The gear according to any one of modes 1 to 3, wherein the outer peripheral portion has groove portions along a width direction of the gear on an annular inner surface of the outer peripheral portion.

Mode 5. The gear according to any one of modes 1 to 4, further comprising metal connecting portions which connect the outer peripheral portion and the central portion.

Mode 6. The gear according to mode 5, wherein the connecting portions are evenly arranged.

Mode 7. The gear according to mode 5 or 6, wherein there are three connecting portions.

Mode 8. The gear according to any one of mode 1 to 7, wherein the resin portion exists entirely between the outer peripheral portion and the central portion.

Mode 9. A gear component comprising tooth portions and a support portion for supporting the tooth portions, wherein
the gear component is annular and made of a metal.

Mode 10. A gear component comprising tooth portions and a support portion that supports the tooth portions, a central portion, and connecting portions that connect the support portion and the central portion, wherein
the support portion is annular, and the gear component is entirely formed of a metal.

Mode 11. The gear component according to mode 9 or 10, comprising a convex portion on an annular inner surface of the support portion which protrudes along a center direction of the annular inner surface.

Mode 12. The gear component according to any one of modes 9 to 11, further comprising a wall-shaped protruding portion along a circumferential direction of the support 26 portion on an annular inner surface of the support portion.

Mode 13. The gear component according to any one of modes 9 to 12, having groove portions along a width direction of the gear component on an annular inner surface of the support portion.

Mode 14. An annular metal gear component comprising tooth portions and a support portion that supports the tooth portion, wherein
a plurality of the tooth portions are provided on an outside of the support portion along its entire circumference,
a plurality of groove portions are provided along a width direction of a gear evenly on an annular inner surface of the support portion,
the groove portions are present such a ratio that at least one groove portion is provided per one tooth portion or adjacent two or more tooth portions, and
each groove portion is formed such that it is located to correspond to a position where the tooth portion is present on the supporting portion.

Mode 15. The gear component according to mode 14, wherein the number of the groove portions is the same as the number of the tooth portions, and each groove portion is present inside each tooth portion.

Mode 16. The gear component according to mode 14 or 15, wherein a cross-sectional shape of the groove portion is a rectangle or isosceles trapezoid.

Mode 17. The gear component according to any one of modes 14 to 16, wherein a cross-sectional shape of the groove portion is geometrically similar to a shape of the tooth portion.

Mode 18. The gear component according to any one of modes 14 to 17, wherein the groove portion intrudes into the tooth portion such that a groove bottom of the groove portion is located beyond and outside a tooth root circle.

Mode 19. The gear component according to mode 18, wherein a ratio of an intruding length of the groove portion to a tooth depth of the tooth portion is in the range from 15% to 40%.

Mode 20. The gear component according to mode 19, wherein a groove bottom of the groove portion is not located outside an intersection of two straight lines each connecting a pitch point of one tooth flank and a root point of the other tooth flank.

Mode 21. A gear comprising an annular metal outer peripheral portion having tooth portions, and a metal central portion, wherein
a resin portion is present between the metal outer peripheral portion and the metal central portion,
a plurality of the tooth portions are provided on an outside of the metal outer peripheral portion along its entire circumference,
the metal outer peripheral portion includes a plurality of groove portions provided along a width direction of the gear evenly on an annular inner surface of the metal outer peripheral portion,
the groove portions are present such a ratio that at least one groove portion is provided per one tooth portion or adjacent two or more tooth portions, and
each groove portion is formed such that it is located to correspond to a position where the tooth portion is present on the metal outer peripheral portion.

Mode 22. The gear of mode 21, wherein the number of the grooves portions is the same as the number of the tooth portions, and each groove portions is inside each tooth portion.

Mode 23. The gear according to mode 21 or 22, wherein a cross-sectional shape of the groove portion is a rectangle or isosceles trapezoid.

Mode 24. The gear according to any one of modes 21 to 23 wherein a cross-sectional shape of the groove portion is geometrically similar to a shape of the tooth portion.

Mode 25. The gear according to any one of modes 21 to 24, wherein the groove portion intrudes into the tooth portion such that a groove bottom of the groove portion is located beyond and outside a tooth root circle.

Mode 26. The gear according to mode 25, wherein a ratio of an intruding length of the groove portion to a tooth depth of the tooth portion is in the range from 15% to 40%.

Mode 27. The gear according to mode 26, wherein a groove bottom of the groove portion is not located outside an intersection of two straight lines each connecting a pitch point of one tooth flank and a root point of the other tooth flank.

INDUSTRIAL APPLICABILITY

According to the present invention, since the weight reduction of the gears is possible while having an adequate strength, the gear of the present invention can be usefully employed in the various machinery, particularly the industrial robots or the automobiles.

EXPLANATION OF REFERENCES 1a, 1b, 1c . . . gear
2 . . . outer periphery portion
3 . . . central portion
4 . . . resin portion
5 . . . tooth portion
6 . . . convex portion
7 . . . protruding portion
8 . . . support portion
9 . . . concave portion
10 . . . convex portion
11 . . . connecting portion
12 . . . groove portion
20 . . . annular outer surface
21 . . . annular inner surface
22 . . . root circle
23 . . . tooth root
24 . . . groove portion opening
25 . . . annular portion
26 . . . groove bottom
27 . . . root circle
28 . . . tip circle
29 . . . reference circle
30 . . . tooth tip
31, 32 . . . tooth flank
33, 34 . . . trapezoidal leg
35 . . . line connecting pitch point and root point
40 . . . axis of line symmetry of tooth portion
41 . . . axis of line symmetry of groove portion

The invention claimed is:

1. An annular metal gear component comprising:
a tooth portion; and
a support portion that supports the tooth portion, wherein:
a groove portion is provided along a width direction of the annular metal gear component on an annular inner surface of the support portion;
the groove portion intrudes into the tooth portion such that a groove bottom of the groove portion is located beyond and outside a tooth root circle;
a ratio of an intruding length of the groove portion to a tooth depth of the tooth portion is in a range from 15% to 40%;
a groove bottom of the groove portion is not located outside an intersection of two straight lines each connecting a pitch point of a first tooth flank and a root point of a second tooth flank;
the tooth portion is one of a plurality of tooth portions provided on an outside of the support portion along an entire circumference thereof; and
the groove portion is one of a plurality of groove portions provided along the width direction of the annular metal gear component on the annular inner surface of the support portion.

2. The annular metal gear component according to claim 1, wherein the number of the plurality of groove portions is the same as the number of the plurality of tooth portions, and the plurality of groove portions intrude into the plurality of tooth portions, respectively.

3. The annular metal gear component according to claim 1, wherein a cross-sectional shape of one of the plurality of groove portions is a rectangle or isosceles trapezoid.

4. The annular metal gear component according to claim 1, wherein a cross-sectional shape of one of the plurality of groove portions is geometrically similar to a shape of one of the plurality of groove portions.

5. A gear comprising:
an annular metal outer peripheral portion having a tooth portion;
a metal central portion; and
a resin portion between the annular metal outer peripheral portion and the metal central portion,
wherein:
a groove portion is provided along a width direction of the gear on an annular inner surface of the annular metal outer peripheral portion;
the groove portion intrudes into the tooth portion such that a groove bottom of the groove portion is located beyond and outside a tooth root circle;
a ratio of an intruding length of the groove portion to a tooth depth of the tooth portion is in a range from 15% to 40%;
the tooth portion is one of a plurality of tooth portions provided on an outside of the annular metal outer peripheral portion along an entire circumference thereof; and
the groove portion is one of a plurality of groove portions provided along the width direction of the gear evenly on the annular inner surface of the annular metal outer peripheral portion.

6. The gear of claim 5, wherein the number of the plurality of groove portions is the same as the number of the plurality of tooth portions, and the plurality of groove portions intrude into the plurality of tooth portions, respectively.

7. The gear according to claim 5, wherein a cross-sectional shape of one of the plurality of groove portions is a rectangle or isosceles trapezoid.

8. The gear according to claim 5, wherein a cross-sectional shape of one of the plurality of groove portions is geometrically similar to a shape of one of the plurality of groove portions.

9. The gear according to claim 5, wherein a groove bottom of one of the plurality of groove portions is not located outside an intersection of two straight lines each connecting a pitch point of a first tooth flank and a root point of a second tooth flank.

* * * * *